(12) United States Patent
Shen (10) Patent No.: US 8,307,755 B2
(45) Date of Patent: Nov. 13, 2012

(54) CONTAINER WITH AN IMPROVED STRUCTURE

(76) Inventor: Tzu-Yuan Shen, Nantou County (TW)

( * ) Notice: Subject to any disclaimer, the term of this patent is extended or adjusted under 35 U.S.C. 154(b) by 442 days.

(21) Appl. No.: 12/728,560

(22) Filed: Mar. 22, 2010

(65) Prior Publication Data

US 2011/0226133 A1 Sep. 22, 2011

(51) Int. Cl.
*A47J 31/18* (2006.01)
*A47J 31/44* (2006.01)
*A47J 31/00* (2006.01)

(52) U.S. Cl. .............. 99/322; 99/317; 99/323; 220/501; 220/505; 220/506; 220/707; 220/709

(58) Field of Classification Search .................... 99/317, 99/318, 321–323; 220/501, 503, 505, 506, 220/707, 709
See application file for complete search history.

(56) References Cited

U.S. PATENT DOCUMENTS

| 2,020,859 | A  | * | 11/1935 | Spalding ........................ 99/317 |
| 2,809,578 | A  | * | 10/1957 | Campbell ....................... 99/312 |
| 7,219,600 | B1 | * | 5/2007  | Haven et al. ................... 99/318 |
| 7,779,751 | B2 | * | 8/2010  | Gilbert ............................ 99/318 |
| 8,205,542 | B2 | * | 6/2012  | Gilbert ........................ 99/289 D |
| 2007/0056447 | A1 | * | 3/2007 | Swartz et al. .................. 99/287 |
| 2008/0282900 | A1 | * | 11/2008 | Huang .......................... 99/322 |
| 2011/0056386 | A1 | * | 3/2011 | Taketani ....................... 99/317 |
| 2011/0250332 | A1 | * | 10/2011 | Geissler ...................... 426/435 |

* cited by examiner

*Primary Examiner* — Raleigh W. Chiu
(74) *Attorney, Agent, or Firm* — Rosenberg, Klein & Lee (57) ABSTRACT

A container with an improved structure includes a body having an opening. The opening is covered with a cover. The bottom of the cover has a first assembly part. A supporting base is accommodated inside the body. One end of the supporting base has a second assembly part to hang on the first assembly part. The other end of the supporting base has a connecting part for connecting with an infusion object. When the supporting base is hung on the first assembly part using its second assembly part, the supporting base can be shaken with a force.

7 Claims, 8 Drawing Sheets

CONTAINER WITH AN IMPROVED STRUCTURE

BACKGROUND OF THE INVENTION

1. Field of Invention

The invention relates to an infuser and, in particular, to a container with an improved structure.

2. Related Art

In general, drink containers for making tea or coffee whose residues need to be removed has a filter cup for holding the tea or coffee in an accommodating space thereof. A cover is then used to close the accommodating space. When it is in use, one pours hot water into the accommodating space to immerse the tea or coffee in the filter cup in the hot water.

However, the above-mentioned conventional drink container restricts tea or coffee completely inside the filter cup. It therefore takes a longer time for the tealeaves to fully expand or the coffee flavor to be completely released. As a result, most users often shake the container in hope of shortening the tea or coffee making time. Nonetheless, one usually has to shake the container greatly in order to quickly mix the liquid inside and outside the filter cup.

In view of the foregoing, it is the purpose of the invention to provide a better solution.

SUMMARY OF THE INVENTION

An objective of the invention is to provide a container with an improved structure that can greatly shorten the infusing time.

Another objective of the invention is to provide a container with an improved structure that is simple and easy to assemble.

To achieve the above-mentioned objectives, the disclosed container includes:

a body, which has an accommodating space and an opening formed on its one end and connected with the accommodating space;

a cover, which is provided at the opening and has a first assembly part on the end surface toward the accommodating space; and a supporting base, which is disposed in the accommodating space, with one end having a second assembly part for hanging on the first assembly part and the other end having a connecting part for the connection of an infusion object;

wherein when the supporting base is hung on the first assembly part using its second assembly part, the supporting base can withstand a force to shake using the first assembly part as a pivot.

Furthermore, the first assembly part is a connecting arm extending toward the accommodating space of the body. The end portion of the first assembly part has a protruding edge. The second assembly part consists of two symmetric hook arms. The two opposite surfaces of the two hook arms are defined with a hook part corresponding to the protruding edge of the first assembly part. From top to bottom, the hook part has a concave surface gradually expanding toward the first assembly part, a neck part extending longitudinally, and a limiting recess for accommodating the protruding edge of the first assembly part. The diameter of the top portion of the concave surface is larger than the outer diameter of the protruding edge of the first assembly part, in order to guide the protruding part with the top portion of the concave surface. The diameter of the neck part is smaller than the outer diameter of the protruding edge of the first assembly part. When the protruding edge of the first assembly part is disposed in the limiting recess, it is restricted by the limiting recess and the neck part so that the supporting base is hung on the first assembly part by hooking.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
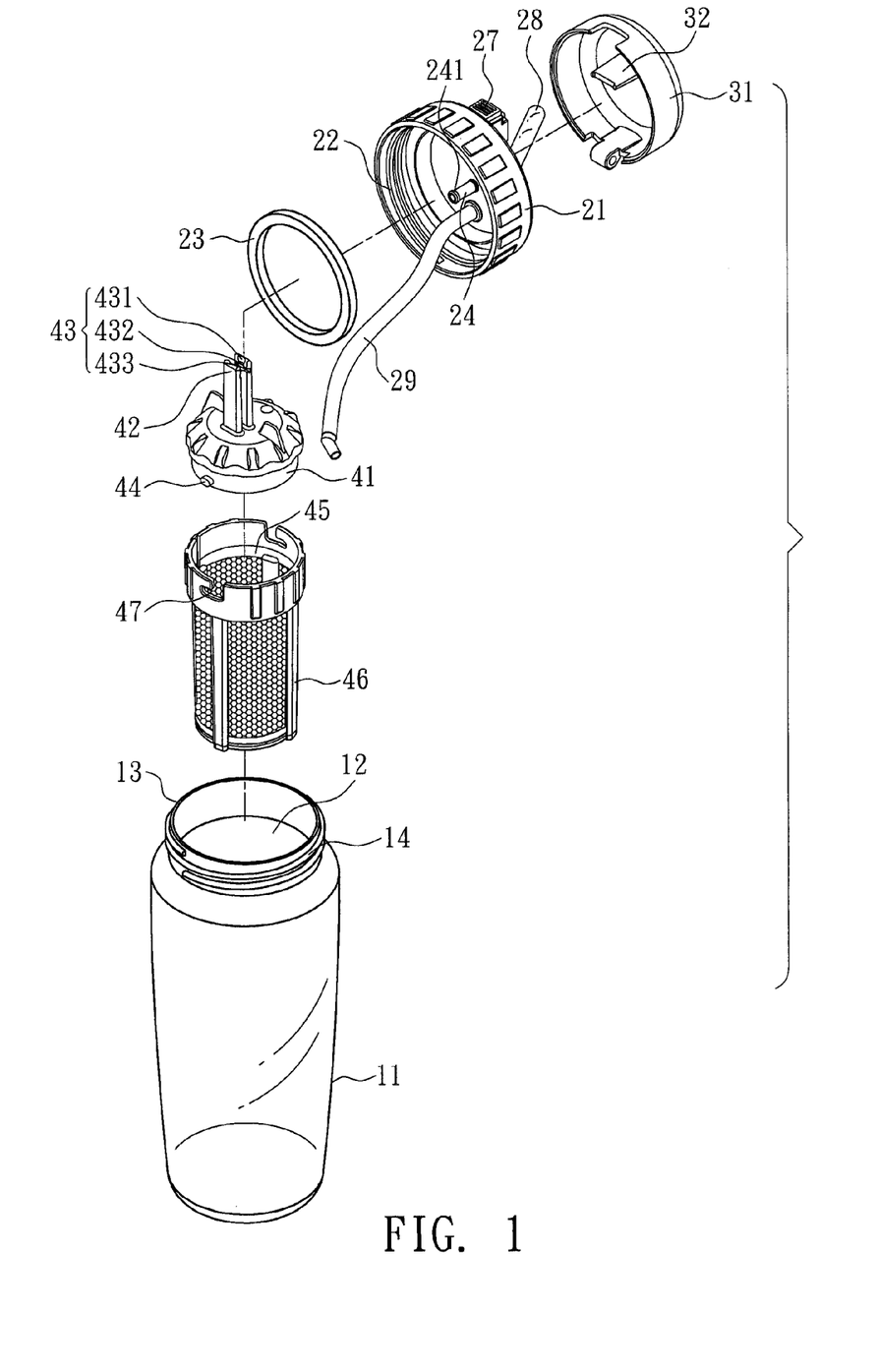
FIG. 1 is a three-dimensional exploded view of the invention.
Figure 2:
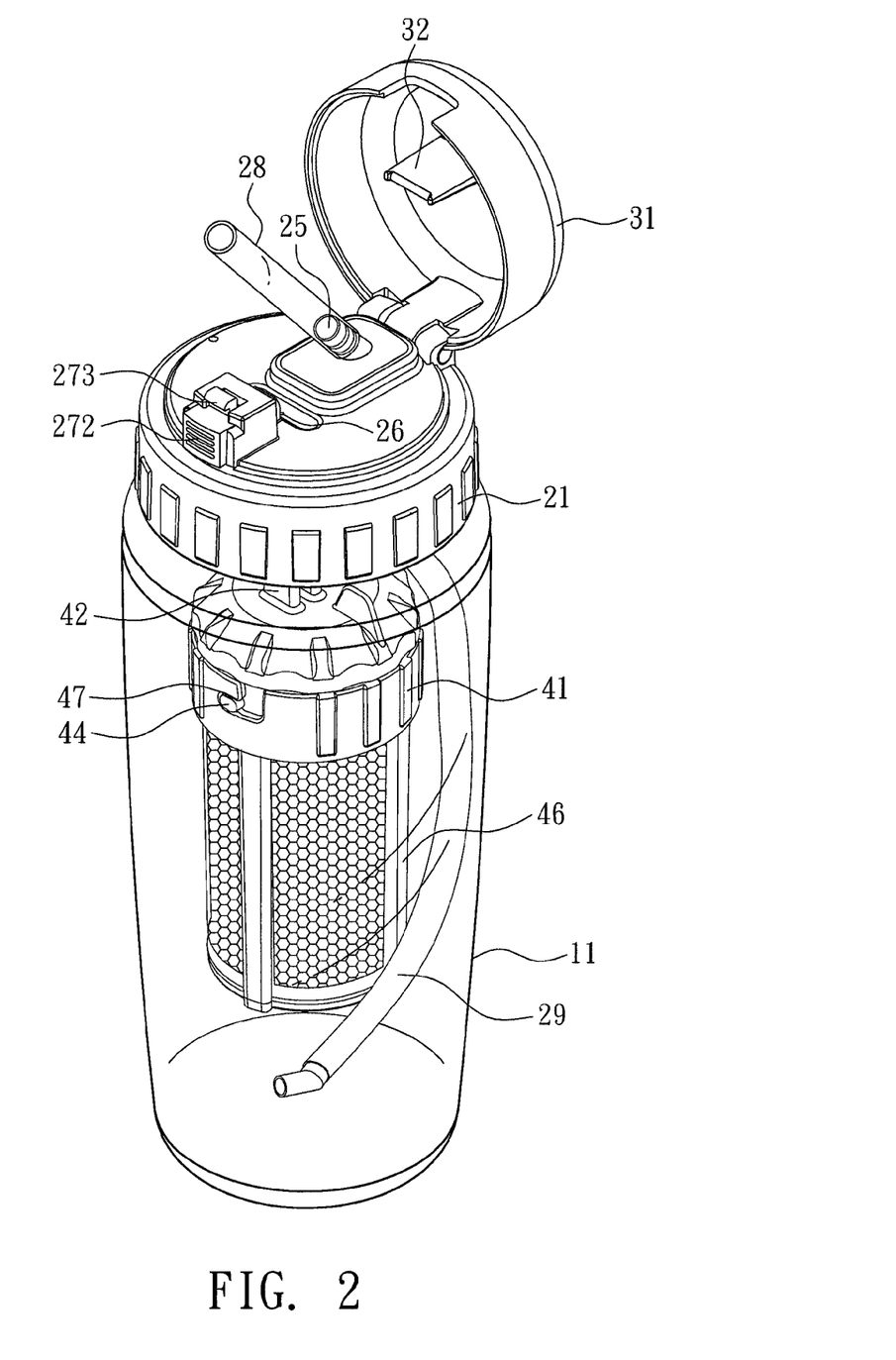
FIG. 2 is a three-dimensional perspective view of the invention after assembly.
Figure 3:
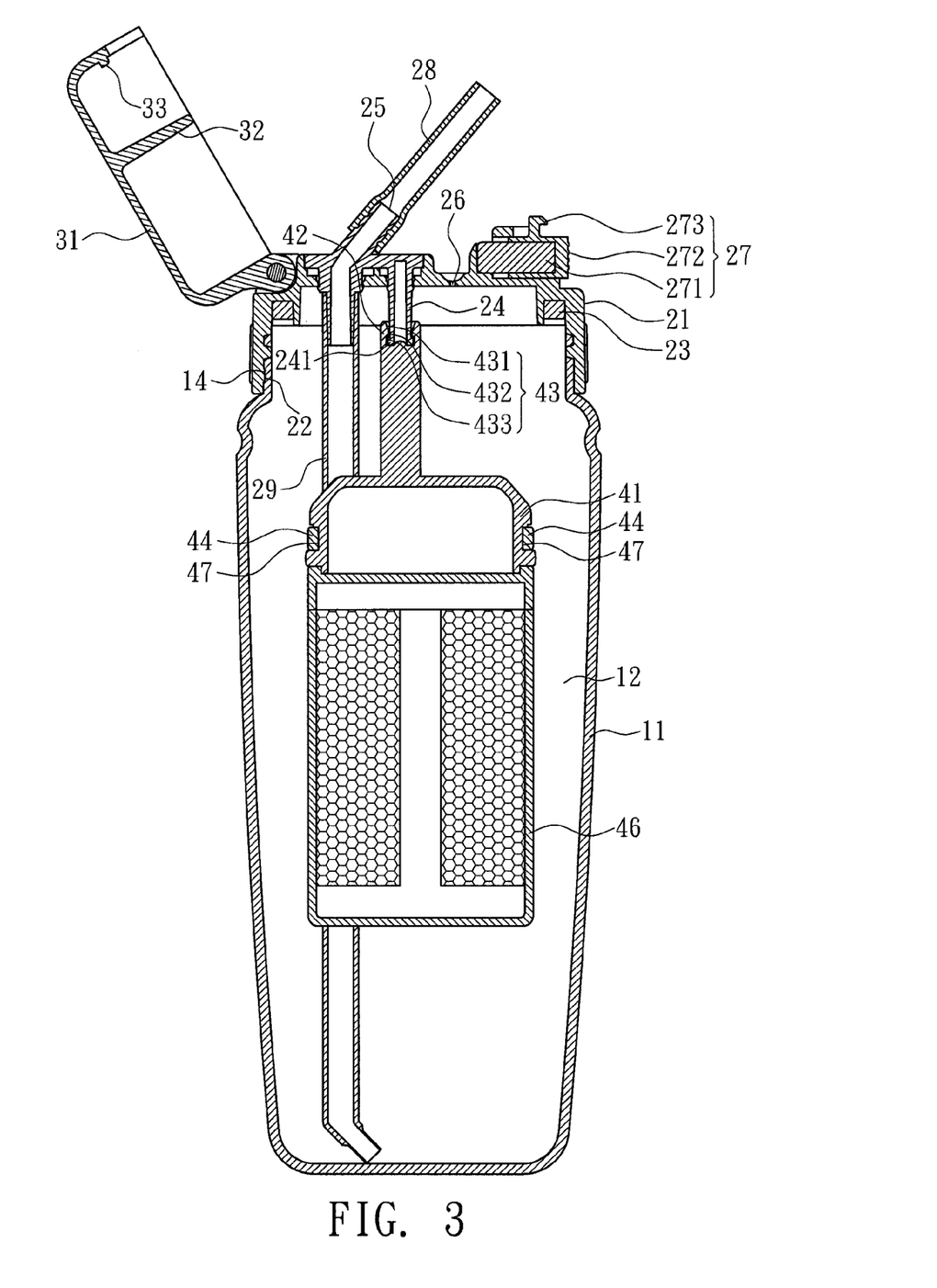
FIG. 3 is a schematic structural view of the invention after assembly.

Please refer to FIGS. 1 to 3. The disclosed container with an improved structure includes a body 11, a cover 21, and a supporting base 41.

The body 11 is cylindrical and has an accommodating space 12. Its one end is formed with an opening 13 in communication with the accommodating space 12. The surrounding of the opening 13 is formed with a first thread part 14.

Figure 4:
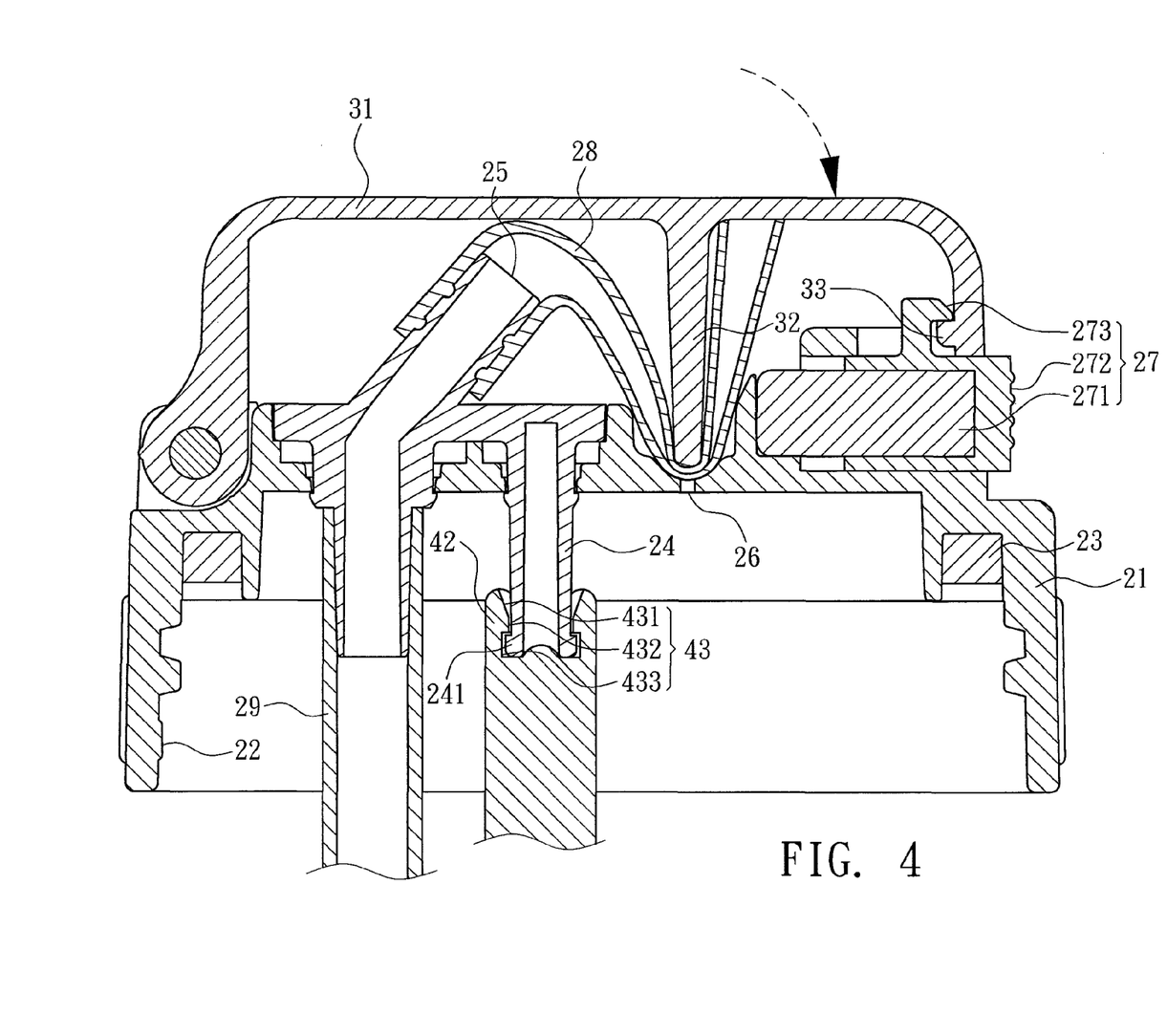
FIG. 4 depicts the invention in use, showing that the turning cover is covering the water outlet.

The bottom of the cover 21 is formed with a second thread part 22 corresponding to the first thread part 14 on the body 11, so that the cover 21 can be locked on the body 11. The inner side on the bottom of the cover 21 corresponding to the opening 13 of the body 11 is provided with a seal ring 23 to enhance the waterproof effect when the cover 21 is locked on the body 11. The bottom of the cover 21 is protruded with a first assembly part 24 extending toward the accommodating space 12 of the body 11. In this embodiment, the first assembly part 24 is a connecting arm extending toward the accommodating space 12 of the body 11. The end portion of the first assembly part 24 is further formed with a protruding edge 241, which has an annular shape and a diameter slightly larger than the first assembly part 24. The top end of the cover 21 has a water outlet 25, a ventilation hole 26, and an open/close switch 27. In this embodiment, the water outlet 25 is mounted with an elastic sucking pipe 28. The end of the water outlet 25 is connected with another extended sucking pipe 29. The open/close switch 27 consists of an elastic object 271 and a button 272 pushed by the elastic object 271. The button 272 is protruded with a blocking part 273. A turning cover 31 is pivotally disposed at an appropriate position on the top edge of the cover 21 for closing the water outlet 25. The inner edge of the turning cover 31 also has a pressing board 32 and a block 33. When the turning cover 31 covers the water outlet 25, as shown in FIG. 4, the pressing board 32 of the turning cover 31 exactly pushes and bends the sucking pipe 28 so that it seals the ventilation hole 26. At this moment, the block 33 of the turning cover 31 engages with the blocking part 273 of the open/close switch 27. The turning cover 31 continues to cover the water outlet 25. When one depresses the button 272 of the open/close switch 27, the engagement between the blocking part 273 of the button 272 and the block 33 of the turning cover 31 is released. The elasticity of the sucking pipe 28 then pushes the turning cover 31 to open automatically.

The supporting base 41 is disposed in the accommodating space 12 of the body 11. Its top has a second assembly part 42 to hang on the first assembly part 24. In this embodiment, the second assembly part 42 consists of two hook arms symmetrically extending upward. The two opposite surfaces of the two hook arms are defined with hook part 43 to hook onto the protruding edge 241 of the first assembly part 24. From top to bottom, the hook part 43 has a concave surface 431 gradually expanding toward the first assembly part 24, a neck part 432 extending longitudinally, and a limiting recess 433 for accommodating the protruding edge 241 of the first assembly part 24. The diameter of the concave surface 431 is larger than the outer diameter of the protruding edge 241 of the first assembly part 24 to guide the insertion of the protruding edge 241 of the first assembly part 24 via the concave surface 431. The diameter of the neck part 432 is smaller than the outer diameter of the protruding edge 241 of the first assembly part 24. When the protruding edge 241 of the first assembly part 24 is disposed in the limiting recess 433, the first assembly part 24 and its protruding edge 241 are restricted by the neck part 432 and the limiting recess 433 so that the supporting base 41 hangs on the first assembly part 24 by hooking. The bottom of the supporting base 41 has a connecting part 44 for the connection of an infusion object. The connecting part 44 is a protruding point. The connecting part 44 of the supporting base 41 connects a filter cup 46 with a filling space 45. The filling space 45 of the filter cup 46 is used to accommodate the infusion object (not shown). The top portion of the filter cup 46 is formed with a notch 47 corresponding to the connecting part 44 of the supporting base 41. By turning the filter cup 46, the connecting part 44 can engage with the notch 47 to position the filter cup 46.

Figure 5:
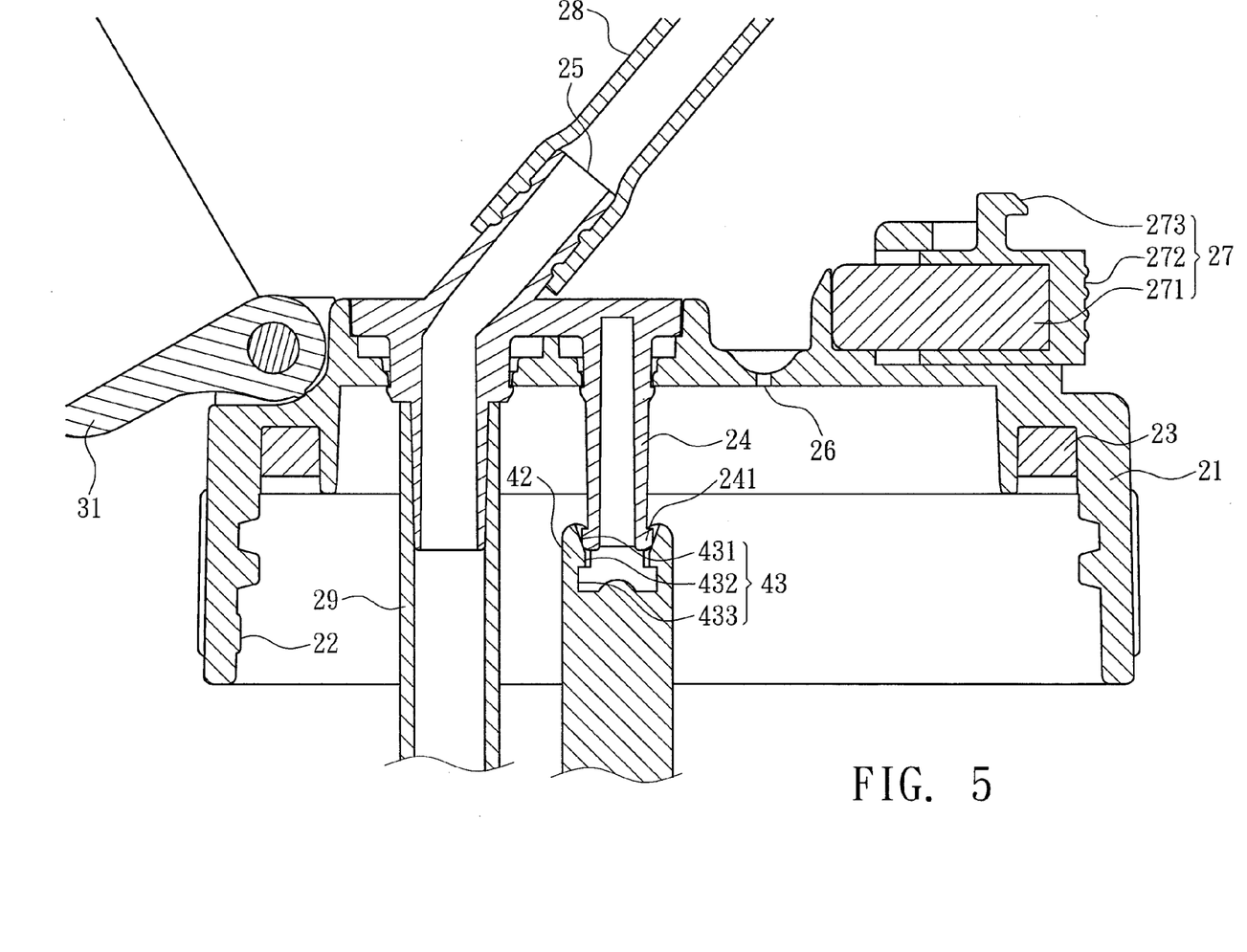
FIG. 5 depicts the invention in use, showing that the concave surface of the hook part is guiding the insertion of the protruding edge of the first assembly part.

Please refer to FIG. 5. To install the supporting base 41, the diameter of the top portion of the concave surface 431 on the hook part 43 is larger than the outer diameter of the protruding edge 241 of the first assembly part 24. Therefore, when the supporting base 41 connects to the first assembly part 24 of the cover 21 using its hook part 43, the concave surface 431 of the hook part 43 can guide the insertion of the protruding edge 431 of the first assembly part 24.

Figure 6:
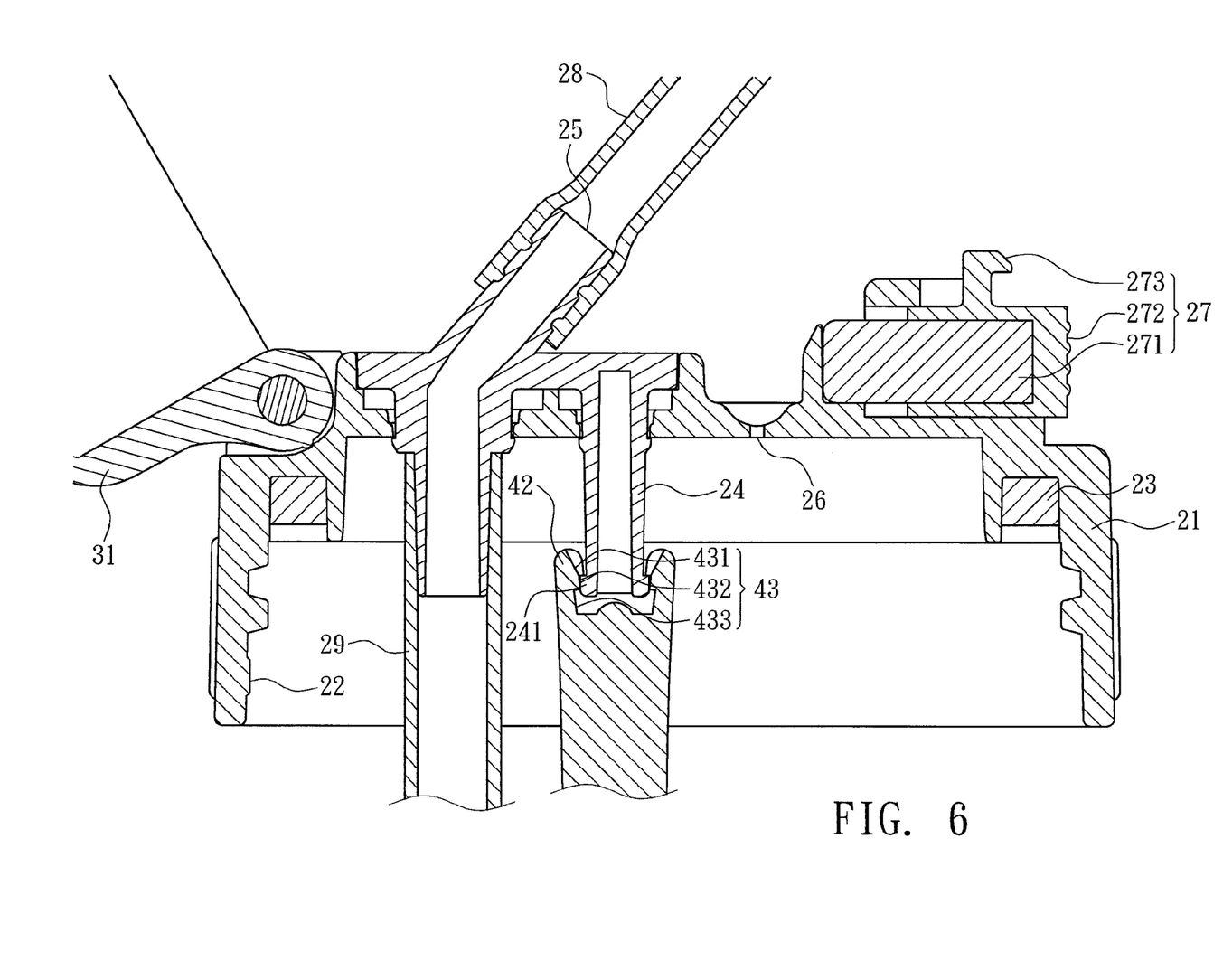
FIG. 6 depicts the invention in use, showing that the two hook arms of the second assembly part are slightly pushed apart by the protruding edge of the first assembly part.
Figure 7:
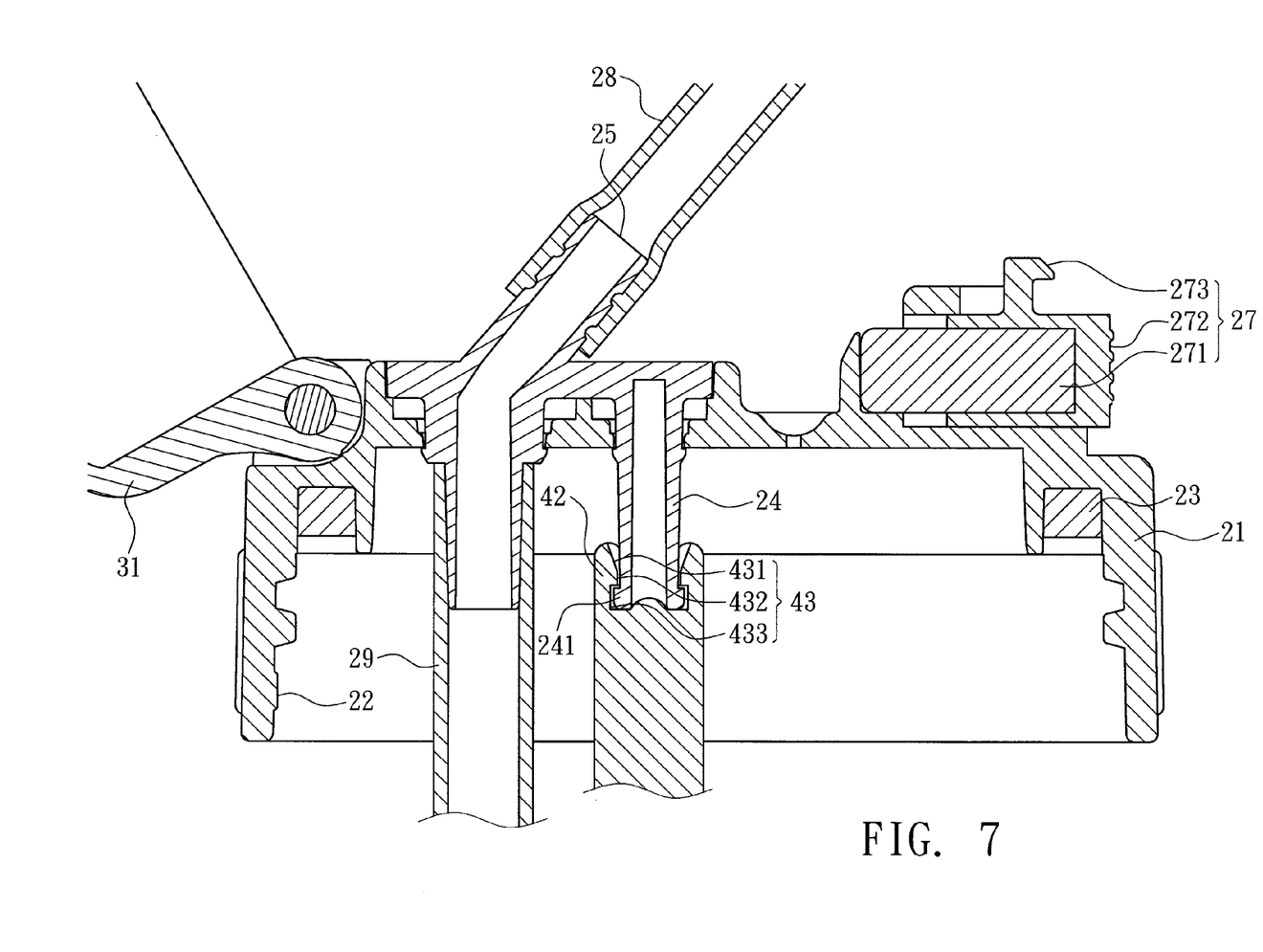
FIG. 7 depicts the invention in use, showing that the protruding edge of the first assembly part engages with the limiting recess of the hook part.

Please refer to FIG. 6. Since the bottom portion of the concave surface 431 is shrinking, when the user exerts a force to move the protruding edge 241 of the first assembly part 24 toward the bottom of the concave surface 431, the protruding edge 241 of the first assembly part 24 pushes the bottom of the concave surface 431. The two hook arms of the second assembly part 42 are slightly pushed apart by the protruding edge 241. Thereby, the protruding edge 241 of the first assembly part 24 can smoothly pass the concave surface 431 and the neck part 432, engaging the limiting recess 433 of the hook part 43. This completes the assembly, as shown in FIG. 7. The protruding edge 241 of the first assembly part 24 is restricted by the limiting recess 433 and the neck part 432. The supporting base 41 can firmly hooked and hung on the first assembly part 24 in the shape of connecting arm. It cannot escape the first assembly 24 in the downward direction. Thus, the supporting base 41 can easily support a heavier infusion object.

Figure 8:
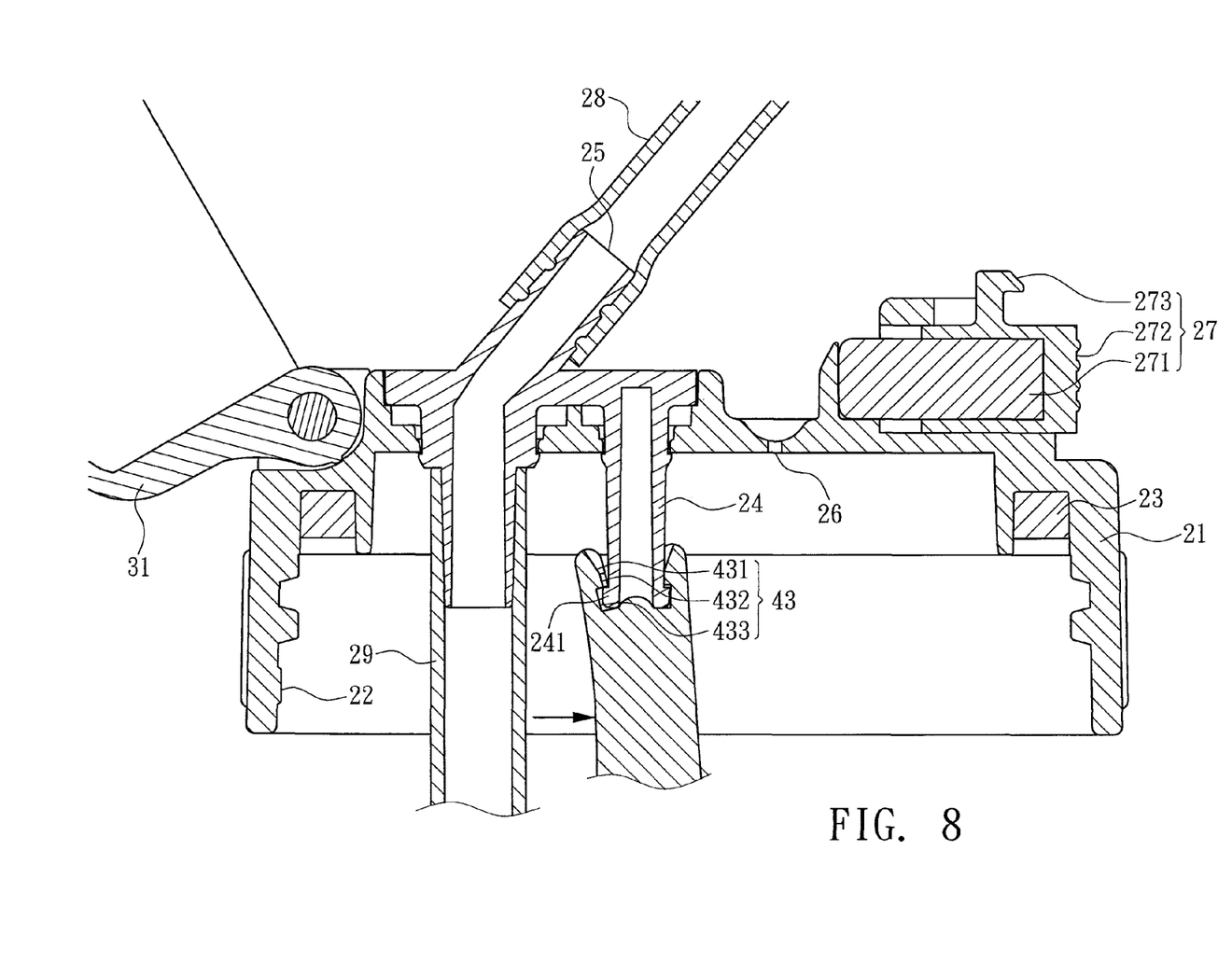
FIG. 8 depicts the invention in use, showing that the protruding edge of the first assembly part departs from the limiting recess of the hook part.

To take the supporting base 41 off of the first assembly part 24, as shown in FIG. 8, the user only needs to exert a side force on the supporting base 41. The limiting recess 433 of the hook part 43 pushes against the protruding edge 241 of the first assembly part 24. This forces the two hook arms of the second assembly part 42 to slightly bend, so that the protruding edge 241 of the first assembly part 24 smoothly departs from the limiting recess 433. This completes the process of disassembly.

The invention with the structure described above has the following advantages:

1. The supporting base 41 is hung on the first assembly part 24 by hooking. It can be exerted with a force and swing with respect to the first assembly part 24. Thus, the user only needs to shake the body 11 lightly in order for the supporting base 41 hung on the first assembly part 24 to shake in a larger magnitude. This can effectively shorten the tea or coffee making time. It also prevents hot water from spilling due to serious shaking.

2. The supporting base 41 is easy to assemble or disassemble according to the invention.

3. When the disclosed supporting base 41 hooks to the first assembly part 24, the protruding edge 241 of the first assembly part 24 is restricted by the limiting recess 433 and the neck part 432 of the hook part 43, so that the supporting base 41 can be firmly hooked onto the first assembly part 24 in the shape of a connecting arm. It cannot depart from the first assembly 24 in the downward direction. The supporting base 41 can thus withstand a heavier infusion object.

4. When the turning cover 31 covers the water outlet 25, the pressing board 32 of the turning cover 31 pushes and bends the sucking pipe 28 to close the ventilation hole 26. This can prevent water from leaking. When the turning cover 31 is not covering the water outlet 25, the elasticity of the sucking pipe 28 makes the turning cover 31 open automatically.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A container with an improved structure, comprising:
   a body, which has an accommodating space and an opening formed on its one end and connected with the accommodating space;
   a cover, which is provided at the opening and has a first assembly part on the end surface toward the accommodating space; and
   a supporting base, which is disposed in the accommodating space, with one end having a second assembly part for hanging on the first assembly part and the other end having a connecting part for the connection of an infusion object;
   wherein when the supporting base is hung on the first assembly part using its second assembly part, the supporting base can withstand a force to shake using the first assembly part as a pivot.

2. The container with an improved structure of claim 1, wherein the first assembly part is a connecting arm extending toward the accommodating space of the body and has a protruding edge on its end portion, the second assembly part consists of two symmetric hook arms, and the two opposite surfaces of the two hook arms are defined with a hook part for the protruding edge of the first assembly part to engage.

3. The container with an improved structure of claim 2, wherein from top to bottom the hook part has a concave surface gradually expanding toward the first assembly part, a neck part extending longitudinally, and a limiting recess for accommodating the protruding edge of the first assembly part, the diameter of the top portion of the concave surface is larger than the outer diameter of the protruding edge of the first assembly part for guiding the insertion of the protruding edge of the first assembly part via the top portion of the concave surface, the diameter of the neck part is smaller than the outer diameter of the protruding edge of the first assembly part so that, when the protruding edge of the first assembly part is disposed in the limiting recess, the first assembly part and the protruding edge thereof are restricted by the neck part and the limiting recess in such a way that the supporting base hangs on the first assembly part by hooking.

4. The container with an improved structure of claim 1, wherein a seal ring is disposed at the bottom of the cover corresponding to the inner edge of the opening of the body.

5. The container with an improved structure of claim 1, wherein the cover has a water outlet and a ventilation hole, the water outlet is mounted with an elastic sucking pipe, a turning cover to cover the water outlet is pivotally provided at an appropriate position on the top edge of the cover, the inner edge of the turning cover further has a pressing board, the pressing board of the turning cover pushes and bends the sucking pipe to seal the ventilation hole when the turning cover covers the water outlet, and the elasticity of the sucking pipe pushes the turning cover to open automatically when the turning cover is released from covering the water outlet.

6. The container with an improved structure of claim 5, wherein the cover further has an open/close switch that is comprised of an elastic object and a button urged by the elastic object, the button is protruded with a blocking part and the inner edge of the turning cover has a block, and when the turning cover covers the water outlet, the block of the turning cover engages with the blocking part of the open/close switch for the turning cover to remain covering the water outlet.

7. The container with an improved structure of claim 1, wherein the connecting part of the supporting base is a protruding point for the connection of a filter cup with a filling space, the filling space of the filter cup is used to accommodate an infusion object, the top portion of the filter cup has a notch corresponding to the connecting part of the supporting base for the filter cup to be engaged with and positioned at by turning.

* * * * *